(12) United States Patent
Leung et al.

(10) Patent No.: US 7,697,523 B2
(45) Date of Patent: Apr. 13, 2010

(54) METHOD AND APPARATUS FOR DATA PACKET TRANSPORT IN A WIRELESS COMMUNICATION SYSTEM USING AN INTERNET PROTOCOL

(75) Inventors: Nikolai K. N. Leung, Takoma Park, MD (US); Nileshkumar J. Parekh, San Diego, CA (US); Raymond T. Hsu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1300 days.

(21) Appl. No.: 09/970,487

(22) Filed: Oct. 3, 2001

(65) Prior Publication Data

US 2003/0063591 A1    Apr. 3, 2003

(51) Int. Cl.
H04L 12/28    (2006.01)
(52) U.S. Cl. .................................. 370/390; 370/338
(58) Field of Classification Search ................. 370/338, 370/389, 390, 392, 401, 432, 474
See application file for complete search history.

(56) References Cited

U.S. PATENT DOCUMENTS

| | | | |
|---|---|---|---|
| 4,870,408 A | 9/1989 | Zdunek et al. |
| 5,101,501 A | 3/1992 | Gilhousen et al. |
| 5,325,357 A | 6/1994 | Kimoto et al. |
| 5,778,187 A | 7/1998 | Monteiro et al. |
| 5,946,316 A | 8/1999 | Chen et al. |
| 5,978,386 A | 11/1999 | Hamalainen |
| 6,065,061 A | 5/2000 | Blahut et al. |
| 6,108,706 A | 8/2000 | Birdwell |
| 6,185,430 B1 | 2/2001 | Yee |
| 6,253,069 B1 | 6/2001 | Mankovitz |
| 6,345,307 B1 | 2/2002 | Booth |
| 6,373,829 B1 | 4/2002 | Vilmur |
| 6,385,461 B1 | 5/2002 | Raith |

(Continued)

FOREIGN PATENT DOCUMENTS

EP    0702477    3/1996

(Continued)

OTHER PUBLICATIONS

Baccelli F. et al., "Self Organizing Hierarchical Multicast Trees and Their Optimization," INFOCOM '99. IEEE, 1081-1089 (Mar. 21, 1999).

(Continued)

*Primary Examiner*—Ricky Ngo
*Assistant Examiner*—Christine Ng
(74) *Attorney, Agent, or Firm*—Kam T. Tam

(57) ABSTRACT

Method and apparatus for data packet transport in a wireless transmission system supporting broadcast transmissions. A multicast tree is built between nodes through neighboring routers. The multicast tree forms a tunnel through which the broadcast content is transmitted. The broadcast message is encapsulated in an Internet Protocol packet for transmission through the multicast tree. At least one multicast tree is formed between the Internet portion of the system and the wireless portion of the system, such as the Access Network. In one embodiment, an external multicast tree is formed between a content source and a packet data service node, and an internal multicast tree is formed between the packet data service node and a packet control function node.

12 Claims, 13 Drawing Sheets

U.S. PATENT DOCUMENTS

| | | | |
|---|---|---|---|
| 6,449,491 B1 | 9/2002 | Dailey | |
| 6,490,259 B1 * | 12/2002 | Agrawal et al. | 370/331 |
| 6,606,706 B1 * | 8/2003 | Li | 713/162 |
| 6,735,177 B1 * | 5/2004 | Suzuki | 370/238 |
| 6,751,218 B1 * | 6/2004 | Hagirahim et al. | 370/390 |
| 6,781,999 B2 * | 8/2004 | Eyuboglu et al. | 370/399 |
| 6,788,681 B1 * | 9/2004 | Hurren et al. | 370/389 |
| 6,801,508 B1 * | 10/2004 | Lim | 370/310.1 |
| 6,885,874 B2 | 4/2005 | Grube | |
| 6,895,216 B2 * | 5/2005 | Sato et al. | 455/3.06 |
| 7,016,351 B1 * | 3/2006 | Farinacci et al. | 370/392 |
| 7,039,180 B1 * | 5/2006 | Issaa et al. | 379/399.01 |
| 7,046,672 B2 | 5/2006 | Liao et al. | |
| 7,058,809 B2 | 6/2006 | White et al. | |
| 7,079,502 B2 * | 7/2006 | Yamano et al. | 370/312 |
| 2001/0055298 A1 | 12/2001 | Baker et al. | |
| 2002/0002541 A1 | 1/2002 | Williams | |

FOREIGN PATENT DOCUMENTS

| | | |
|---|---|---|
| EP | 0 854 618 A2 | 7/1998 |
| EP | 0924898 | 6/1999 |
| EP | 0951198 | 10/1999 |
| EP | 1 071 296 A1 | 1/2001 |
| EP | 1071296 A1 * | 1/2001 |
| EP | 1075118 | 2/2001 |
| JP | 10-200536 | 7/1998 |
| JP | 10-063598 | 8/1998 |
| JP | 11-313059 | 11/1999 |
| JP | 11-355460 | 12/1999 |
| WO | 9825422 | 6/1998 |
| WO | 9959355 | 11/1999 |
| WO | 0013356 | 3/2000 |
| WO | 00056018 | 9/2000 |
| WO | WO 00/57601 | 9/2000 |
| WO | 0062547 | 10/2000 |
| WO | 0078008 | 12/2000 |
| WO | WO 00/76125 | 12/2000 |

OTHER PUBLICATIONS

Chu-Sing Yang et al., "An Efficient Multicast Delivery Scheme to Support Mobile IP," Database and Expert Systems Applications, 1999. IEEE, 683-688 (Sep. 1, 1999).

Li Gong et al., "Trade-offs in Routing Private Multicast Traffic," Global Telecommunications Conference, 1995. IEEE, 2124-2128 (Nov. 13, 1995).

Toh C-K et al., "ABAM: On-Demand Associativity-Based Multicast Routing for Ad Hoc Mobile Networks," Vehicular Technology Conference, 2000. IEEE, 987-993 (2000).

International Search Report—International Search Authority—European Patent Office—PCT/US02/31774—DOM: Jun. 6, 2003.

International Search Report—International Search Authority—European Patent Office—PCT/US02/31775—DOM: May 9, 2003.

Paul K et al: "A Stability-Based Distributed Routing Mechanism to Support Unicast and Multicast Routing in Ad Hoc Wireless Network" Computer Communications, Elsevier Science Publishers BV, Amsterdam, NL, vol. 24, No. 18, Dec. 1, 2001, pp. 1828-1845, XP004309745 ISSN: 0140-3664.

Lin R et al: "A Multicast Routing Protocol for Multihop Wireless Networks," Global Telecommunications Conference, XP010373304, Taiwan, 235-239, 1999.

European Search Report—EP07019633, Search Authority—Munich, Nov. 16, 2007.

Bormann, et al., "Robust Header Compression (ROHC)," Internet Engineering Task Force IETF Draft, 1-145, Feb. 26, 2001.

Brown: "The Electronic Post It Note Model for Mibile Computing Applications," Computing Lab, The University, Canterbury, Kent, The Institution of Electrical Engineers, IEEE, Savoy Place, London, WC2R OBL, UK.

Estrin, et al., "The Protocol Independent Multicast-Sparse Mode (PIM-SM)," RFC 2362, Jun. 1998.

Farinacci, et al., "Generic Routing Encapsulation (GRE)," Network Working Group Request for Comments 2784, Mar. 1-8, 2000.

Miyazaki: "A Stream-data Multicast Protocol Using IP Unicast Address" Technical Report of IEICE, IN2007-9, May 11, 2001.

Moy, "Multicast Extensions to OSPF," RFC 1584, Mar. 1994.

Simpson, "PPP in HDLC-Like Framing," RFC 1662, Jul. 1994.

Takahashi: "Prospect of Push type Information Providing SErvice/Technology," Information Processing, vol. 39, No. 11, Nov. 15, 1998, p. 1124-1131.

Waitzman, et al., "The Distance Vector Multicast Routing Protocol (DVMRP)," RFC 1075, Nov. 1, 1998.

European Search Report - EP05005647, SEarch Authority - Munich, DOM Apr. 26, 2005.

International Preliminary Report on Patentability - PCT/US02-031775 - IPEA/US, Alexandria, VA Mar. 1, 2006.

international Preliminary Report on Patentability - PCT/US02-031774 - IPEA/US, Alexandria, VA, Oct. 3, 2005.

Chunhung, et al: "A Muiticast Routing Protocol for Multihop Wireless Networks," Dept. of Computer Science and Information Engineering, ChungCheng university; Taiwan, Global Telecommunication Conference, XP010373304.

* cited by examiner

METHOD AND APPARATUS FOR DATA PACKET TRANSPORT IN A WIRELESS COMMUNICATION SYSTEM USING AN INTERNET PROTOCOL

REFERENCE TO CO-PENDING APPLICATIONS FOR PATENT

The present invention is related to the following Applications for Patent in the U.S. Patent & Trademark Office:
  "Method and Apparatus for Data Transport in a Wireless Communication System" by Raymond Hsu, having Ser. No. 09/933,977, now U.S. Pat. No. 6,707,801.

FIELD

The present invention relates to wireless communication systems generally and specifically, to methods and apparatus for message compression in preparation for transmission in a wireless communication system.

BACKGROUND

There is an increasing demand for packetized data services over wireless communication systems. As traditional wireless communication systems are designed for voice communications, the extension to support data services introduces many challenges. The conservation of bandwidth is the overwhelming concern for most designers. In uni-direction transmissions, such as broadcast transmissions, a single broadcast content is provided to multiple users. The users are identified by a unique identifier which is then included in addressing information. In such a system, multiple infrastructure elements may be required to duplicate the broadcast packets so as to identify each of the multiple intended receivers. The duplication of transmission signals uses up valuable bandwidth thus reducing the efficiency of the communication system, and increases the processing requirements of intermediate infrastructure elements. For a broadcast service in particular, the number of target recipients may be prohibitively large, thus creating problems of resource allocation and loss of available bandwidth.

There is a need, therefore, for an efficient and accurate method of transmitting data to multiple recipients in a wireless communication system. Further, there is a need for a method of routing broadcast data to multiple users, wherein each user is uniquely identified as a target recipient.

SUMMARY

Embodiments disclosed herein address the above stated needs by providing a method for routing IP packets in a wireless communication system, wherein packets are routed to the Access Network using a multicast address.

In one aspect, a communication path for processing broadcast messages in a wireless communication system, includes a first multicast tree portion, wherein the broadcast message is transmitted addressed to a multicast Internet Protocol address, a second multicast tree portion, wherein the broadcast message is transmitted addressed to a multicast Internet Protocol address, and a third portion, wherein the broadcast message is transmitted addressed to at least one unicast address.

In another aspect, In a wireless communication system supporting broadcast transmissions, the system having a broadcast source node and at least one termination node, at least one router coupled between the source node and the at least one termination node, a method for setting up transmission paths includes determining a transmission range for a broadcast transmission within the system, building a multicast tree from a first termination node to the broadcast source node, the multicast tree including the at least one router, and transmitting a broadcast message through the multicast tree over the transmission range.

In still another aspect, an infrastructure element for generating Internet Protocol packets in a wireless transmission system supporting broadcast transmissions, the infrastructure element includes means for determining a broadcast transmission range, means for generating an Internet Protocol packet, the Internet Protocol packet having a multicast address, and means for transmitting the Internet Protocol packet.

DETAILED DESCRIPTION

Figure 1:
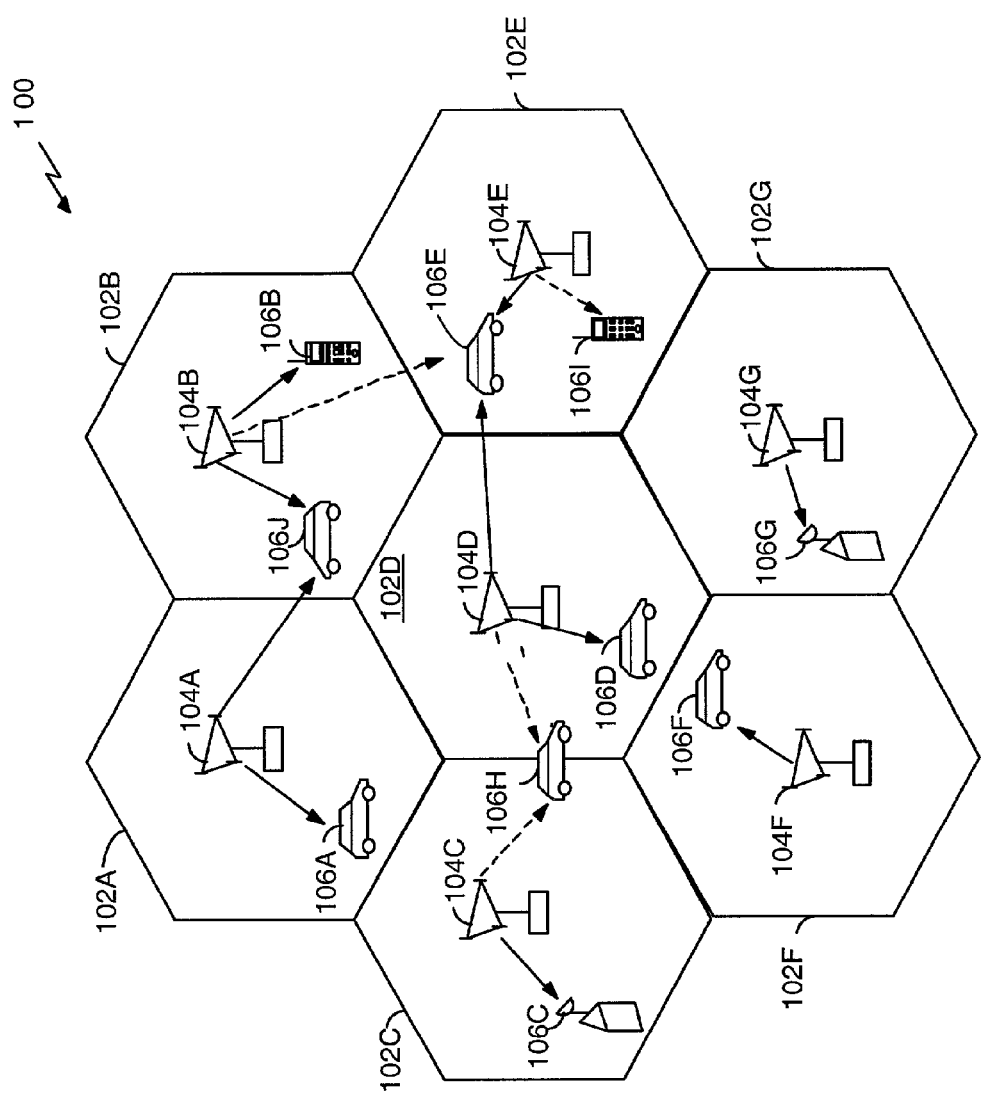
FIG. 1 is a diagram of a spread spectrum communication system that supports a number of users.

The word "exemplary" is used exclusively herein to mean "serving as an example, instance, or illustration." Any embodiment described herein as "exemplary" is not necessarily to be construed as preferred or advantageous over other embodiments.

The efficient use of available bandwidth impacts the performance and breadth of the system. Toward that end, various techniques have been applied to reduce the size of overhead information transmitted along with the data or content information. For example, in a digital transmission, data is transmitted in frames. A frame of information typically includes header information, data payload information, and a tail portion. The frames may be part of a packet of data, part of a data message, or continuous frames in a stream of information, such as audio and/or video streams. Attached to each frame of data (and each packet or message) is a header containing processing information that allows the receiver to understand the information contained in the frame(s). This header information is considered overhead, i.e., processing information transmitted along with information content. The information content is referred to as the payload.

The data frames are transmitted throughout the communication system via various infrastructure elements. In a conventional system, the transmission of information to multiple users requires the duplication of the information at a central packet data control point, such as a Packet Data Service Node (PDSN). The duplication increases the processing requirements of the PDSN and wastes valuable bandwidth. For example, expansion of a given system may require routers and trunks proximate a PDSN be sized sufficiently to handle the duplicated traffic. The PDSN transmits the multiple copies to the base stations, which forward the information to each user. The conventional approach is particularly disadvantageous in a uni-directional broadcast service, wherein many users are receiving the broadcast transmission. The PDSN in this case must make a great number of copies, apply a specific address to each copy and transmit the copies individually.

The PDSN is typically required to provide additional header information identifying each target recipient. For a broadcast service, the number of target recipients may be prohibitively large, thus creating problems of resource allocation and loss of available bandwidth.

An exemplary embodiment of a wireless communication system employs a method of data transport that reduces the bandwidth used by the infrastructure elements while satisfying the accuracy and transmission requirements of the system. In the exemplary embodiment, duplication is performed at the BS or Packet Control Function (PCF) node, freeing the PDSN or central packet data router, to send the message with a multi-cast header to each BS or PCF involved in the broadcast. For example, a message may process through a MC tree to a PCF, wherein the PCF duplicates the message for each BSC and then transmits each message via a distinct Uni-Cast (UC) connection, i.e., connection or secure tunnel created between the PCF and a specific BSC. Note that a UC connection may be considered a point-to-point connection. The exemplary embodiment supports a unidirectional broadcast service. The broadcast service provides video and/or audio streams to multiple users. Subscribers to the broadcast service "tune in" to a designated channel to access the broadcast transmission. As the bandwidth requirement for high speed transmission of video broadcasts is great, it is desirable to reduce the amount of duplication and transmission of duplicate packets over the hops in the network.

The following discussion develops the exemplary embodiment by first presenting a spread-spectrum wireless communication system generally. Next, the broadcast service is introduced; wherein the service is referred to as High Speed Broadcast Service (HSBS), and the discussion includes channel assignments of the exemplary embodiment. A subscription model is then presented including options for paid subscriptions, free subscriptions, and hybrid subscription plans, similar to those currently available for television transmissions. The specifics of accessing the broadcast service are then detailed, presenting the use of a service option to define the specifics of a given transmission. The message flow in the broadcast system is discussed with respect to the topology of the system, i.e., infrastructure elements. Finally, the header compression used in the exemplary embodiment is discussed Note that the exemplary embodiment is provided as an exemplar throughout this discussion; however, alternate embodiments may incorporate various aspects without departing from the scope of the present invention. Specifically, the present invention is applicable to a data processing system, a wireless communication system, a uni-directional broadcast system, and any other system desiring efficient transmission of information.

Wireless Communication System

The exemplary embodiment employs a spread-spectrum wireless communication system, supporting a broadcast service. Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with the cdma200 standard of protocols. Alternate embodiments may incorporate another standard. Still other embodiments may apply the compression methods disclosed herein to other types of data processing systems.

FIG. 1 serves as an example of a communications system 100 that supports a number of users and is capable of implementing at least some aspects and embodiments of the invention. Any of a variety of algorithms and methods may be used to schedule transmissions in system 100. System 100 provides communication for a number of cells 102A through 102G, each of which is serviced by a corresponding base station 104A through 104G, respectively. In the exemplary embodiment, some of base stations 104 have multiple receive antennas and others have only one receive antenna. Similarly, some of base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and system for providing a Soft Handoff in a CDMA Cellular Telephone System", which is assigned to the assignee of the present invention.

The downlink refers to transmission from the base station to the terminal, and the uplink refers to transmission from the terminal to the base station. In the exemplary embodiment, some of terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

Increasing demand for wireless data transmission and the expansion of services available via wireless communication technology have led to the development of specific data services. One such service is referred to as High Data Rate (HDR). An exemplary HDR service is proposed in "EIA/TIA-IS856 cdma2000 High Rate Packet Data Air Interface Specification" referred to as "the HDR specification." HDR service is generally an overlay to a voice communication system that provides an efficient method of transmitting packets of data in a wireless communication system. As the amount of data transmitted and the number of transmissions increases, the limited bandwidth available for radio transmissions becomes a critical resource. There is a need, therefore, for an efficient and fair method of scheduling transmissions in a communication system that optimizes use of available bandwidth. In the exemplary embodiment, system 100 illustrated in FIG. 1 is consistent with a CDMA type system having HDR service.

High Speed Broadcast System (HSBS)

Figure 2:
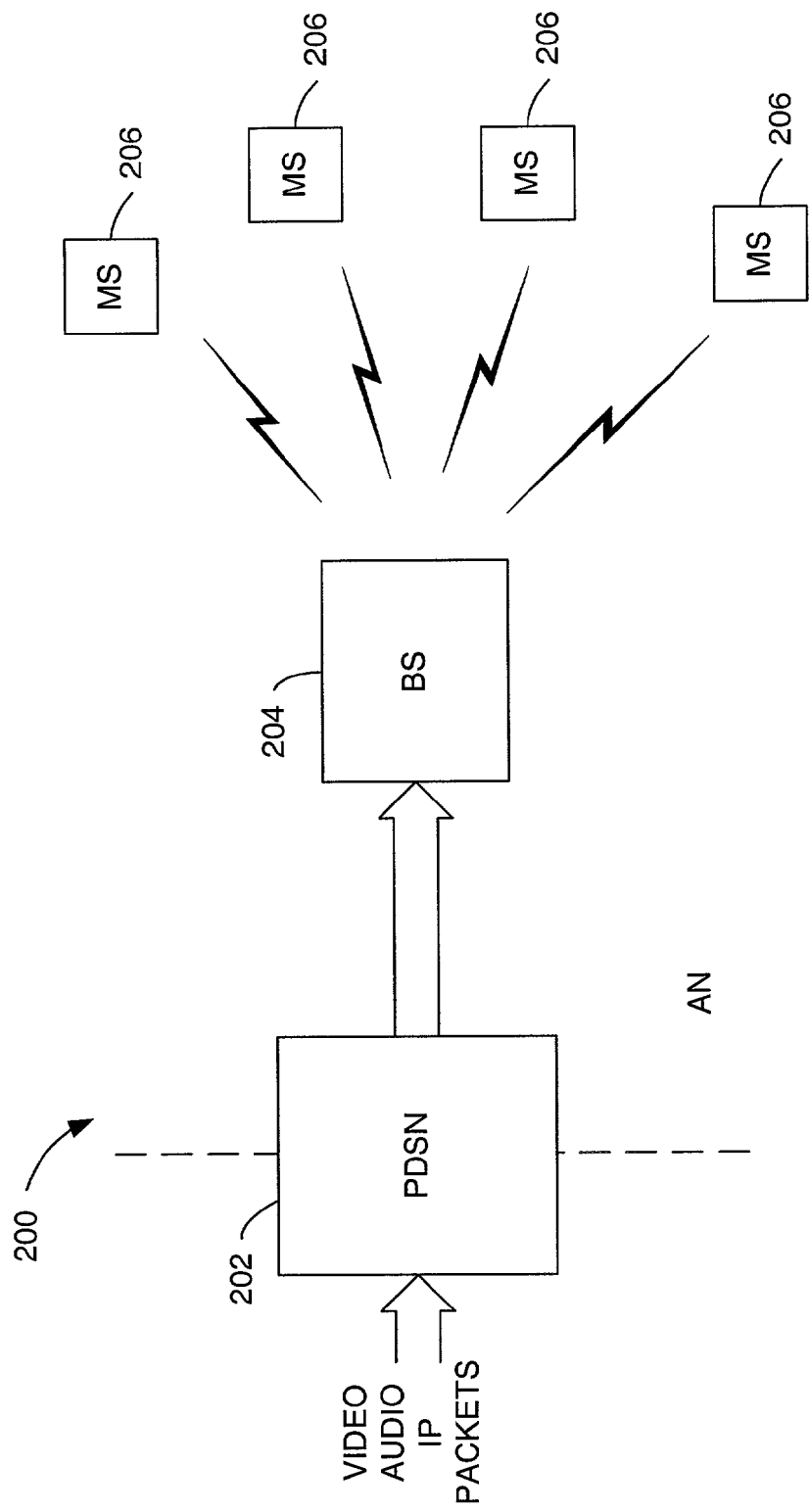
FIG. 2 is a block diagram of the communication system supporting broadcast transmissions.

A wireless communication system 200 is illustrated in FIG. 2, wherein video and audio information is provided to Packet Data Service Node (PDSN) 202. The video and audio information may be from televised programming or a radio transmission. The information is provided as packetized data, such as in IP packets. The PDSN 202 processes the IP packets for distribution within an Access Network (AN). As illustrated the AN is defined as the portions of the system including a BS 204 in communication with multiple MS 206. The PDSN 202 is coupled to the BS 204. For HSBS service, the BS 204 receives the stream of information from the PDSN 202 and provides the information on a designated channel to subscribers within the system 200.

In a given sector, there are several ways in which the HSBS broadcast service may be deployed. The factors involved in designing a system include, but are not limited to, the number of HSBS sessions supported, the number of frequency assignments, and the number of broadcast physical channels supported.

The HSBS is a stream of information provided over an air interface in a wireless communication system. The "HSBS channel" to refer to a single logical HSBS broadcast session as defined by broadcast content. Note that the content of a given HSBS channel may change with time, e.g., 7 am News, 8 am Weather, 9 am Movies, etc. The time based scheduling is analogous to a single TV channel. The "Broadcast channel" refers to a single forward link physical channel, i.e., a given Walsh Code, that carries broadcast traffic. The Broadcast Channel, BCH, corresponds to a single Code Division Multiplex (CDM) channel.

A single broadcast channel can carry one or more HSBS channels; in this case, the HSBS channels will be multiplexed in a Time-Division Multiplex (TDM) fashion within the single broadcast channel. In one embodiment, a single HSBS channel is provided on more than one broadcast channel within a sector. In another embodiment, a single HSBS channel is provided on different frequencies to serve subscribers in those frequencies.

According to the exemplary embodiment, the system 100 illustrated in FIG. 1 supports a high-speed multimedia broadcasting service referred to as High-Speed Broadcast Service (HSBS). The broadcast capabilities of the service are intended to provide programming at a data rate sufficient to support video and audio communications. As an example, applications of the HSBS may include video streaming of movies, sports events, etc. The HSBS service is a packet data service based on the Internet Protocol (IP).

According to the exemplary embodiment, a Content Server (CS) advertises the availability of such high-speed broadcast service to the system users. Any user desiring to receive the HSBS service may subscribe with the CS. The subscriber is then able to scan the broadcast service schedule in a variety of ways that may be provided by the CS. For example, the broadcast schedule may be communicated through advertisements, Short Management System (SMS) messages, Wireless Application Protocol (WAP), and/or some other means generally consistent with and convenient for mobile wireless communications. Mobile users are referred to as Mobile Stations (MSs). Base Stations (BSs) transmit HSBS related parameters in overhead messages, such as those transmitted on channels and/or frequencies designated for control and information, i.e., non-payload messages. Payload refers to the information content of the transmission, wherein for a broadcast session the payload is the broadcast content, i.e., the video program, etc. When a broadcast service subscriber desires to receive a broadcast session, i.e., a particular broadcast scheduled program, the MS reads the overhead messages and learns the appropriate configurations. The MS then tunes to the frequency containing the HSBS channel, and receives the broadcast service content.

The channel structure of the exemplary embodiment is consistent with the cdma2000 standard, wherein the Forward Supplemental Channel (F-SCH) supports data transmissions. One embodiment bundles a large number of the Forward Fundamental Channels (F-FCHs) or the Forward Dedicated Control Channels (F-DCCHs) to achieve the higher data rate requirements of data services. The exemplary embodiment utilizes an F-SCH as the basis for the F-BSCH supporting a payload of 64 kbps (excluding RTP overhead). The F-BSCH may also be modified to support other payload rates, for example, by subdividing the 64-kbps payload rate into substreams of lower rates.

One embodiment also supports group calls in several different ways. For example, by using existing unicast channels, i.e., one forward link channel per MS with no sharing, of F-FCH (or the F-DCCH) on both forward and reverse links. In another example, the F-SCH (shared by group members in the same sector) and the F-DCCH (no frames but the Forward Power Control Subchannel most of the time) on the forward link and the R-DCCH on the reverse link are applied. In still another example, the high-rate F-BSCH on the forward link and the Access Channel (or the Enhanced Access Channel/Reverse Common Control Channel combination) on the reverse link is utilized.

Having a high data rate, the Forward Broadcast Supplemental CHannel (F-BSCH) of the exemplary embodiment may use a very large portion of a base station's forward link power to provide adequate coverage. The physical layer design of HSBC is thus focused on efficiency improvements in a broadcast environment.

To provide adequate support for video services, system design considers the required base station power for various ways to transmit the channel as well as the corresponding video quality. One aspect of the design is a subjective trade-off between the perceived video quality at the edge of coverage and that close to the cell site. As the payload rate is reduced, the effective error correcting code rate is increased, a given level of base station transmit power would provide better coverage at the edge of the cell. For mobile stations located closer to the base stations, the reception of the channel remains error-free and the video quality would be lowered due to the lowered source rate. This same trade-off also applies to other, non-video applications that the F-BSCH can support. Lowering the payload rate supported by the channel increases the coverage at the expense of decreased download speed for these applications. The balancing the relative importance between video quality and data throughput versus coverage is objective. The configuration chosen seeks an application-specific optimized configuration, and a good compromise among all possibilities.

The payload rate for the F-BSCH is an important design parameter. The following assumptions may be used in designing a system supporting broadcast transmissions according to the exemplary embodiment: (1) the target payload rate is 64 kbps, which provides an acceptable video quality; (2) for streaming video services, the payload rate is assumed to include the 12 8-bit bytes per packet overhead of the RTP packets; (3) the average overhead for all layers between RTP and the physical layer is approximately 64, 8-bit bytes per packet plus 8 bits per F-SCH frame overhead used by the MUXPDU header.

In the exemplary embodiment, for non-video broadcast services, the maximum rate supported is 64 kbps. However, many other possible payload rates below 64 kbps are also achievable.

Subscription Models

There are several possible subscription/revenue models for HSBS service, including free access, controlled access, and partially controlled access. For free access, no subscription is needed by the to receive the service. The BS broadcasts the content without encryption and interested mobiles can receive the content. The revenue for the service provider can be generated through advertisements that may also be transmitted in the broadcast channel. For example, upcoming movie-clips can be transmitted for which the studios will pay the service provider.

For controlled access, the MS users subscribe to the service and pay the corresponding fee to receive the broadcast service. Unsubscribed users are not being able to receive the HSBS service. Controlled access can be achieved by encrypting the HSBS transmission/content so that only the subscribed users can decrypt the content. This may use over-the-air encryption key exchange procedures. This scheme provides strong security and prevents theft-of-service.

A hybrid access scheme, referred to as partial controlled access, provides the HSBS service as a subscription-based service that is encrypted with intermittent unencrypted advertisement transmissions. These advertisements may be intended to encourage subscriptions to the encrypted HSBS service. Schedule of these unencrypted segments could be known to the MS through external means.

HSBS Service Option

Figure 3:
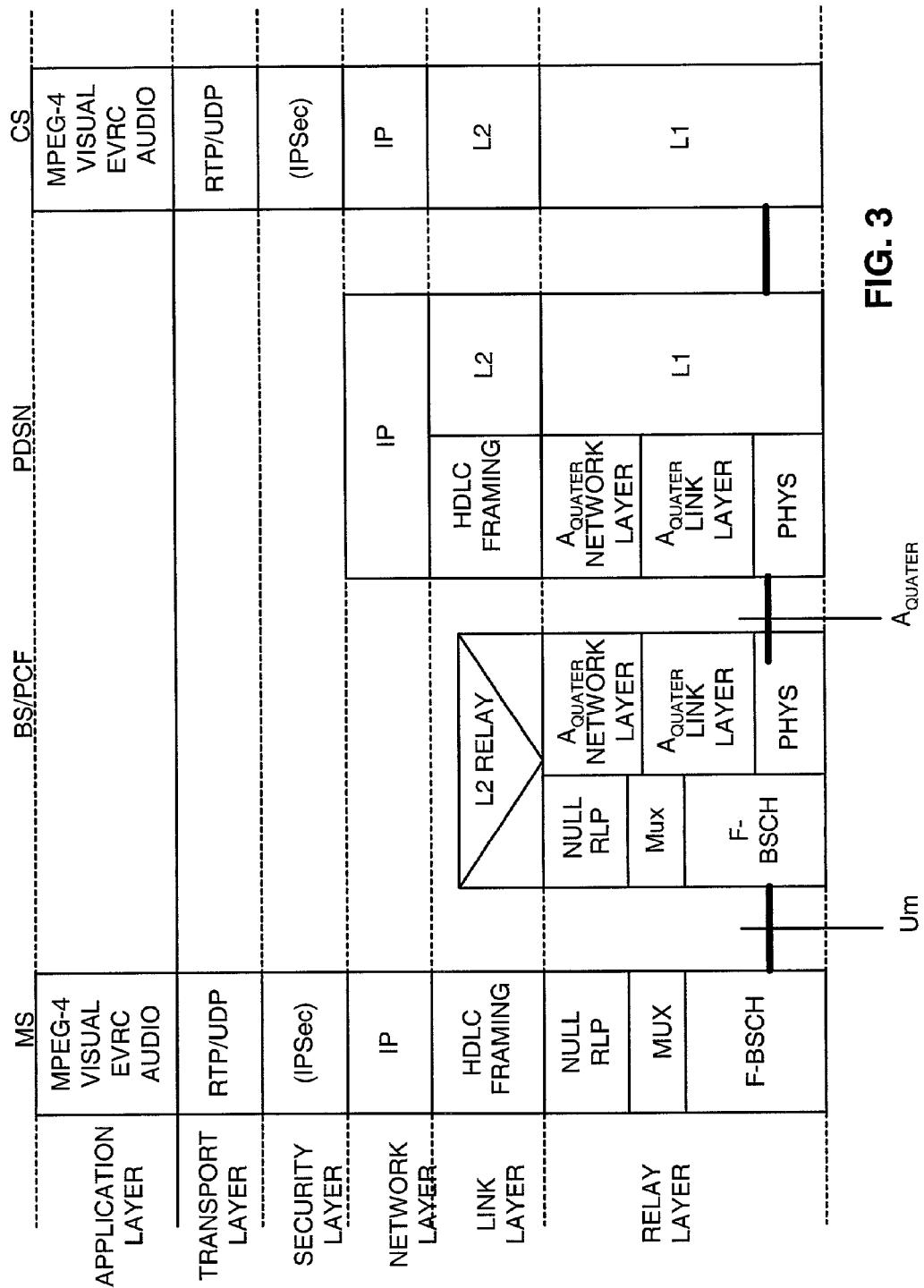
FIG. 3 is a model of the protocol stack corresponding to a broadcast service option in a wireless communication system.
Figure 4:
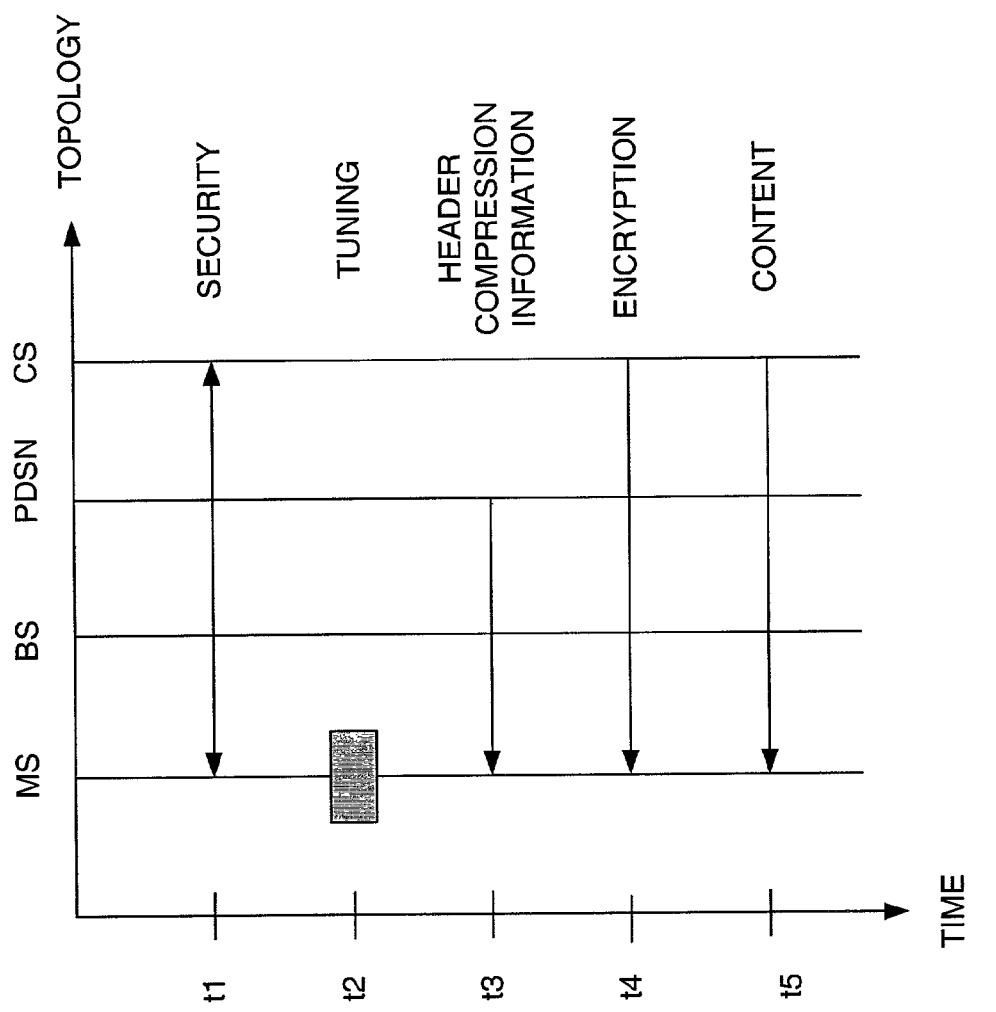
FIG. 4 is a flow diagram for a message flow for broadcast service in a wireless communication system topology.

The HSBS service option is defined by: (1) a protocol stack; (2) options in the protocol stack; and (3) procedures for setting up and synchronizing the service. The protocol stack according to the exemplary embodiment is illustrated in FIGS. 3 and 4. As illustrated in FIG. 3, the protocol stack is specific to the infrastructure element, i.e., MS, BS, PDSN and CS in the exemplary embodiment.

Continuing with FIG. 3, for the application layer of the MS, the protocol specifies audio codec, visual codec, as well as any visual profiles. Additionally, the protocol specifies Radio Transport Protocol (RTP) payload types when RTP is used. For the transport layer of the MS, the protocol specifies a User Datagram Protocol (UDP) port. The security layer of the MS is specified by the protocol, wherein security parameters are provided via out-of-band channels when the security is initially associated with the CS. The network layer specifies the IP header compression parameters. According to one embodiment, at the link layer, data packets are compressed and then an appropriate framing protocol is applied to the compressed data.

Message Flow

FIG. 4 illustrates the call flow of one embodiment for a given system topology. The system includes a MS, BS, PDSN and CS, as listed on the horizontal axis. The vertical axis represents the time. The user or MS is a subscriber to the HSBS service. At time t1 the MS and CS negotiate the subscription security for the broadcast service. Negotiation involves exchange and maintenance of encryption keys, etc., used for receiving the broadcast content on the broadcast channel. The user establishes a security association with the CS on reception of the encryption information. The encryption information may include a Broadcast Access Key (BAK) or a key combination, etc., from the CS. According to one embodiment, the CS provides the encryption information over a dedicated channel during a packet data session, such as via PPP, WAP, or other out-of-band methods.

At time t2 the MS tunes into the broadcast channel and starts to receive packets. At this point in time, the MS is unable to process the received packets because the IP/ESP header is compressed via ROHC, and the MS's decompressor has not been initialized. The PDSN provides header compression information (detailed hereinbelow) at time t3. From the ROHC packet header, the MS detects and obtains a ROHC Initialization & Refresh (IR) packet sent periodically from the PDSN to the broadcast channel. The ROHC IR packet is used to initialize the state of decompressor in the MS, allowing it to decompress the IP/ESP header of the received packets. The MS is then able to process the IP/ESP header of the received packets, however, the MS requires further information to process the ESP payload as the payload is encrypted with a Short-term Key (SK) at the CS. The SK acts in coordination with the BAK, wherein the SK is decrypted at the receiver using the BAK. The CS provides further encryption information, such as updated key information or a current SK at time t4. Note that the CS provides this information periodically to the MS to ensure the ongoing security of the broadcast. At time t5 the MS receives the broadcast content from the CS. Note that alternate embodiments may incorporate alternate compression and decompression methods that provide efficient transmission of the header information. Additionally, alternate embodiments may implement a variety of security schemes to protect the broadcast content. Still alternate embodiments may provide a non-secure broadcast service. The MS uses the encryption information, such as the SK, to decrypt and display broadcast content.

Access Network

Figure 5:
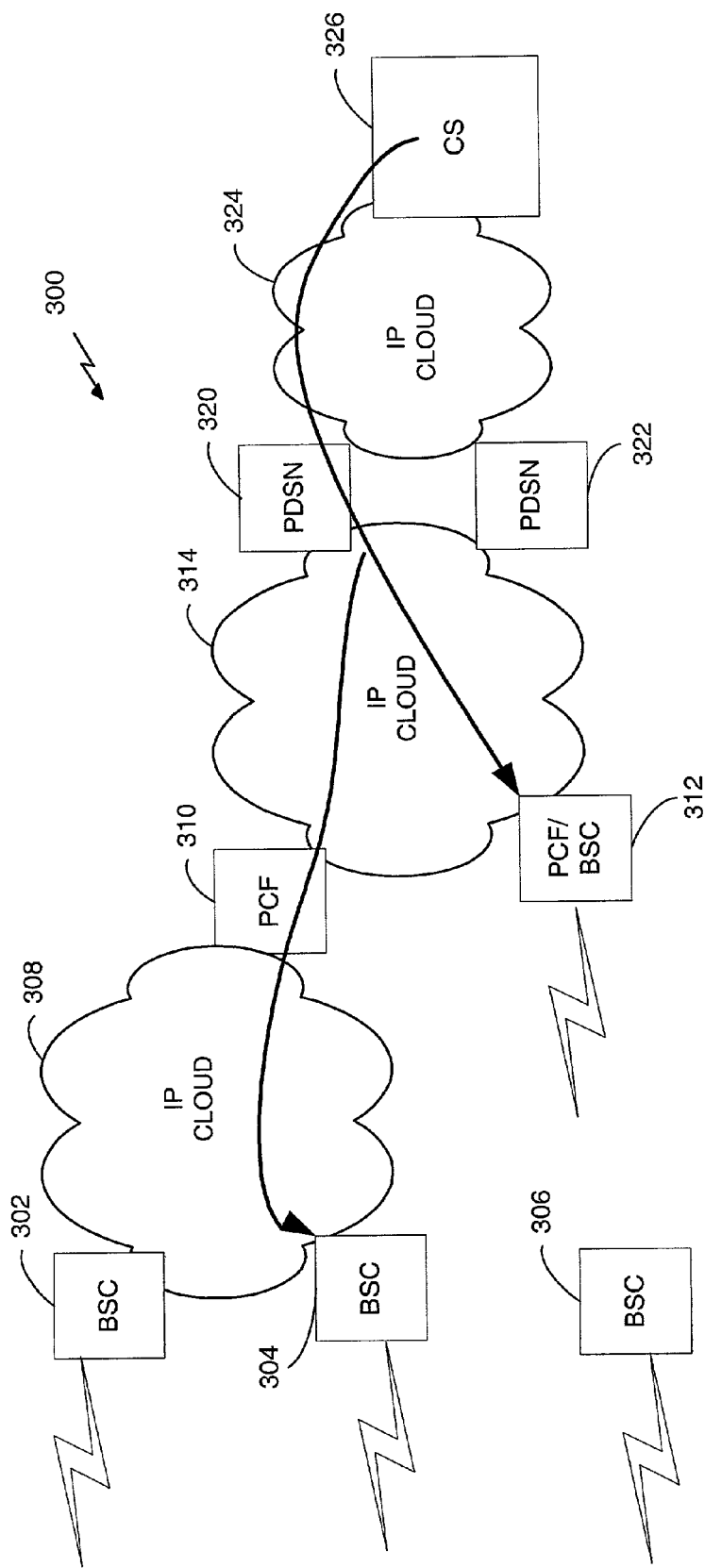
FIG. 5 is a functional diagram of a wireless communication system supporting broadcast transmission with multicast Internet Protocol transmission of broadcast content.

A general access network topology for a system 300 is illustrated in FIG. 5 having a CS 326, two PDSN 320, 322, a PCF 310, a co-located PCF and BSC 312, and three BSC 302, 304, 306. The CS 326 is coupled to the PDSN 320, 322 by way of an IP cloud 324. The IP cloud 324, as well as IP clouds 314 and 308 are basically a configuration of interconnected routers that form an IP path from the CS to various recipients of data from the CS. In the IP cloud 308 a virtual tunnel, referred to as an A8 tunnel, is formed for transmitting information from the PCF 310 to the BSC 302 and the BSC 304. The tunnel may be a GRE tunnel. A protocol referred to as A9 is used for establishing the A8 tunnel. The IP cloud 308 may be labeled an A8/A9 cloud. In the IP cloud 314 a virtual tunnel, referred to as an A10 tunnel, is formed for transmitting information from the PDSN 320 to each of the PCF 310 and the PCF/BSC 312. Note that an A10 tunnel is formed from PDSN 320 to PCF 310 and a second A10 tunnel is formed from PDSN 320 to PCF/BSC 312. The tunnels may be GRE tunnels. A protocol referred to as A11 is used for establishing the A10 tunnel. The IP cloud 314 may be labeled an A10/A11 cloud. One embodiment is consistent with that specified in the cdma2000 and HDR standards, described hereinabove. The Access Network (AN) is defined as the elements and connections from the PDSN to the end user, e.g., MS.

According to one embodiment, the broadcast CS 326 sends IP packets containing encrypted broadcast content to a multicast group identified by a class-D multicast IP address. This address is used in the destination address field of the IP packets. A given PDSN 320 participates in multicast routing of these packets. After compression, the PDSN 320 places each packet in an HDLC frame for transmission. The HDLC frame is encapsulated by a Generic Routing Encapsulation (GRE) packet. Note that the GRE encapsulation forms the A10 tunnel described hereinabove. The key field of the GRE packet header uses a special value to indicate a broadcast bearer connection. The GRE packet is appended with the 20-byte IP packet header having a source address field identifying the IP address of the PDSN 320, and destination address field uses a class-D multicast IP address. The multicast IP address is the same as the one used by the original IP packet from CS 326. The packets delivered in the broadcast connection are provided in sequence; in one embodiment the GRE sequencing feature is enabled. Duplication of the IP multicast packets is done in multicast-capable routers. Note that according to an alternate embodiment, the IP cloud 314 implements point-to-point, or uni-cast, tunnels to individual recipient PCF(s). The decision to us a multicast link or a unicast link for this connection point is made at a higher layer, wherein the UC tunnels provide increased security, and the MC tree provides efficiency.

According to an exemplary embodiment, the CS 326 transmits data to the PDSN 320 via a multicast IP address, wherein the PDSN 320 further transmits data to the PCF 310 and the PCF/BSC 312 also via a multicast IP address. The PCF 310, for example, then determines the number of individual users in the active set that are in the destination subscription group and duplicates the frame received from the CS 326 for each of those users. The PDSN PCF 310 determines the BSC(s) corresponding to each of the users in the subscription group.

In one embodiment, the BSC 304 is adapted to transmit to proximate BSC(s), wherein the BSC 304 may duplicate the received packets and send them to one or more of the neighboring BSC(s). The chaining of BSCs yields better soft handoff performance. The "anchoring" BSC method yields better soft handoff performance. The anchoring BSC 304 duplicates the transmission frame and sends it with the same time-stamp to its neighboring BSCs. The time-stamp information is critical to the soft handoff operation as the mobile station receives transmission frames from different BSCs.

Multi-Cast Service

One type of broadcast service is referred to as MultiCast (MC) service or "Group Call (GC)" wherein a "GC group" includes those users that will be participants in the GC, wherein a group of users is identified for a given MC content. The group of users may be referred to as a MC group. The MC content is intended only for the MC group members. Each active user in the MC group registers with the AN. The AN then tracks the location of each registered user, and targets transmission of the MC message to these locations. Specifically, the AN determines a cell, sector, and/or geographical area within which each of the users of the MC group is located, and then transmits the message to PCFs associated with those cells, sectors, and/or geographic areas.

Figure 6:
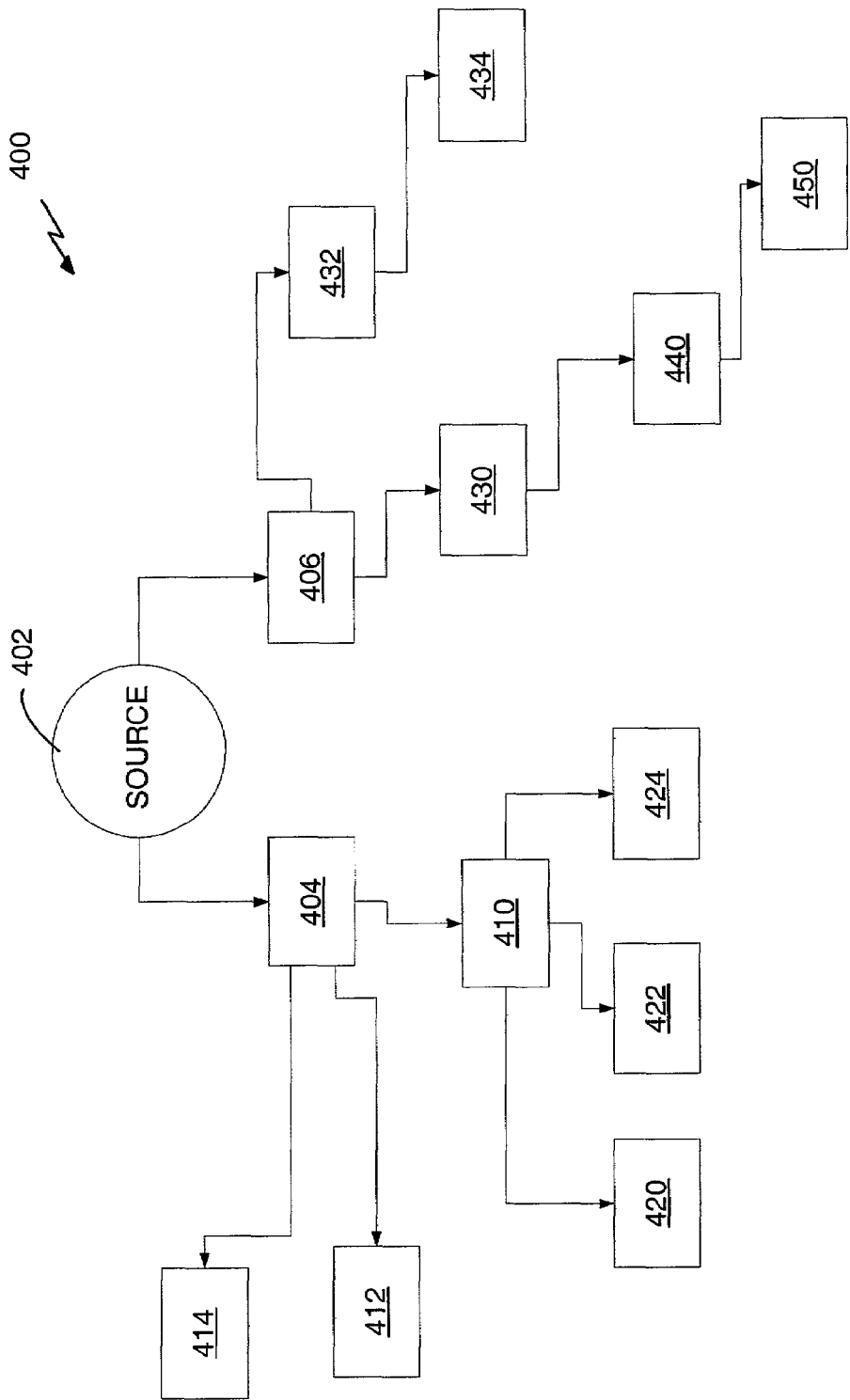
FIG. 6 is an architectural diagram of a multicast tree structure applicable to a communication system.

As opposed to some other type broadcast services wherein the BC message is transmitted without knowledge of the location and activity of the recipients or subscribers, the MC service operates using knowledge of the active users, specifically the location of each active user. Additionally, the users provide location information to the AN. In one embodiment the active users in an MC group register with the AN via IP communications, specifically by using an Internet Group Management Protocol (IGMP) message. As the MC service is able to identify the location of each user, and the MC targets transmission to those locations, the MC service utilizes a router between the PCF(s) and the PDSN(s). The MC service builds a tree of connections that provide a path from the CS to each PCF that is communicating with an active user in the MC group. The tree is referred to as an MC tree; an example of an MC tree is illustrated in FIG. 6 and is discussed hereinbelow.

In a conventional IP network or system, such as a computer network coupled to the Internet, if a user desires to receive MC type information, referred to as the MC content, the user registers with the nearest router using the Internet Group Management Protocol (IGMP). The router then begins the process of building a MC tree by registering with the next adjacent router. The CS then sends MC content in the form of a MC IP packet. The MC IP packet is then routed through the MC tree to the original router. This router duplicates the data for each user desiring the MC content. A common broadcast media in a computer network is an Ethernet hub that connects multiple users to a same information stream.

The combination of the Internet and IP networks with wireless communication systems introduces several distinct problems. One problem is routing the information from the IP network through the wireless network. Several of the interconnections are predefined in a wireless system. For example, as discussed hereinabove, the interface between the BSC and PCF is defined by the A8/A9 connection. Similarly, the PCF to PDSN connection is defined by the A10/A11 connection. One embodiment forms an internal MC tree between the PDSN and PCF, and forms an external MC tree between the PDSN and the CS. The PCF then forms specific tunnels to the various BSCs that request the MC content. This embodiment, discussed hereinbelow, provides efficiency of operation. Another embodiment forms the external MC tree between the PDSN and the CS, while setting up tunnels from the PDSN to each individual PCF that is to receive the MC content. This embodiment provides secure communications.

Generally, the MC path is considered end-to-end, wherein the MC content originates at a source and is transmitted to the end user. The end user may be MS. Alternatively, the MS may be a mobile router that routes the MC content to a network. The end user does not forward the MC content. Note that a MC path may include a plurality of different types of interconnects. For example, one embodiment may incorporate the internal MC tree discussed hereinabove having a termination point at the PCF, and the external MC tree having a termination point at the PDSN. Similarly, the MC path may include point-to-point tunnels, wherein each tunnel is formed between one node and a distinct individual node.

According to an exemplary embodiment illustrated in FIG. 5, a communication system 300 includes a CS 326 in communication with PDSNs 320 and 322 via an IP cloud 324. Note that CS 326 also communicates with other PDSNs not shown. The IP cloud 324 includes a configuration of routers, such as multicast routers (as described hereinabove) and other routers for passing data transmissions through the cloud 324. Transmissions through the IP cloud 324 are IP communications. The routers within the IP cloud 324 accesses communications, such as BC messages and MC messages, to target recipients consistent with the Internet Engineering Task Force (IETF) protocols.

Continuing with FIG. 5, the PDSN 320 and 322 are in communication with PCFs 310 and 312, as well as other PCFs not shown, via another IP cloud 314. The IP cloud 314 includes a configuration of routers, such as multicast routers and other routers for passing data transmissions through the cloud 314. Transmissions through the IP cloud 314 are IP communications. The routers within the IP cloud 314 accesses communications, such as BC messages and MC messages, to target recipients consistent with the Internet Engineering Task Force (IETF) protocols. Further, the PCF 310 communicates with the BSC 304 via still another IP cloud 308. The IP cloud 314 includes a configuration of routers, such as Multicast routers and other routers for passing data transmissions through the cloud 314. Transmissions through the IP cloud 314 are IP communications. The PCF 312 also operates as a BSC and is in communication with any of the users within system 300 (not shown). Note that for clarity three BSCs are illustrated, specifically, BSCs 302, 304 and 306. The system 300 may include any number of additional BSC (not shown). Note that alternate embodiments may incorporate alternate configurations, wherein any or connections indicated by the multiple IP clouds, such as IP clouds 308, 314, 324, may be replaced with point-to-point connections. A point-to-point connection may be a secure connection made between the apparatus at one point, such as at a PCF, to another point, such as a BSC. The point-to-point connection is achieved over an IP cloud, such as IP cloud 308, using the method called tunneling. The basic idea of tunneling is to take an IP packet, encapsulate the packet in GRE/IP and send the resultant packet to a destination point. If the destination address of the outer IP header is a unicast IP address, the process achieves a point-to-point tunnel. If the destination address is a multicast IP address, the process achieves a point-to-multipoint tunnel. Note that all these are done in the same IP cloud. For example, in IP cloud 314, there are several different applicable methods. One method forms a point-to-point tunnel, and a second method forms a point-to-multipoint tunnel. This is contrasted with the connection method used in cloud 324, wherein no GRE tunneling is used and the original multicast IP packet is transmitted.

In the exemplary embodiment, the CS 326 configures an HSBS channel with knowledge of a multicast IP address to be used in the IP cloud 324. The CS uses the MC IP address to send the HSBS content information, referred to as the payload. Note that the configuration of FIG. 8 may be used to broadcast a variety of BC services.

To form a tunnel, the message is encapsulated within an external IP packet. As the encapsulated message transmits through the tunnel, the internal IP address, i.e., IP address of the original IP packet, is ignored. The encapsulation changes the Internet routing of the original IP packet. In the exemplary embodiment, the MC tunnel routes the BC or MC message through the MC tree between PDSN and PCF.

In the exemplary embodiment, the PDSN 320 and the PCFs 310 and 312 are associated with an MC group. In other words, MC group members are located within cells, sectors, and/or geographical areas serviced by the PCFs 310 and 312. The system 300 builds an external MC tree from the CS 326 to the PDSN 320 and an internal tree from the PDSN 320 to PCFs 310 and 312. The PDSN 320 builds the external MC tree by successively registering with neighboring Multicast routers within the IP cloud 324. The external MC tree is built from the PDSN 320 to the CS 326 through the IP network. The PDSN 320 receives the MC message(s) for MC group members via the external MC tree. In other words, MC messages are sent through the external MC tunnel structured by the external MC tree. Each of the PCFs 310 and 312 builds an internal MC tree to the PDSN 320 through the IP cloud 314. The MC message(s) from the PDSN 320 are sent over an internal MC tree in a GRE/IP tunnel.

FIG. 6 illustrates a MC tree 400 having a source 402 and multiple routers 404 to 450. The source 402 is the base of the MC tree 400. The end users 412, 414, 420, 422, 424, 434, and 450 are considered leaves of the MC tree 400. Two main branches are formed via routers 404 and 406. On the first main branch is another branch through router 410. On the second main branch are two subsequent branches: one through 430 and another through 432.

In one embodiment, the tree 400 has a CS as a source. For a broadcast service wherein the broadcast message originates at the CS, the source 402 is a CS. In an alternate embodiment, the source may be another apparatus in the network. For example, for a group call service the message content may originate with another user, wherein the BSC associated with that user is the source of the MC tree. Additionally, there may be a group call manager function in the network that receives messages from a member then forwards the messages through the MC tree to the Group Call members. In each of these cases, the tree provides a pathway for providing same information content to multiple users while conserving bandwidth and avoiding redundant duplication and processing of information.

Figure 7:
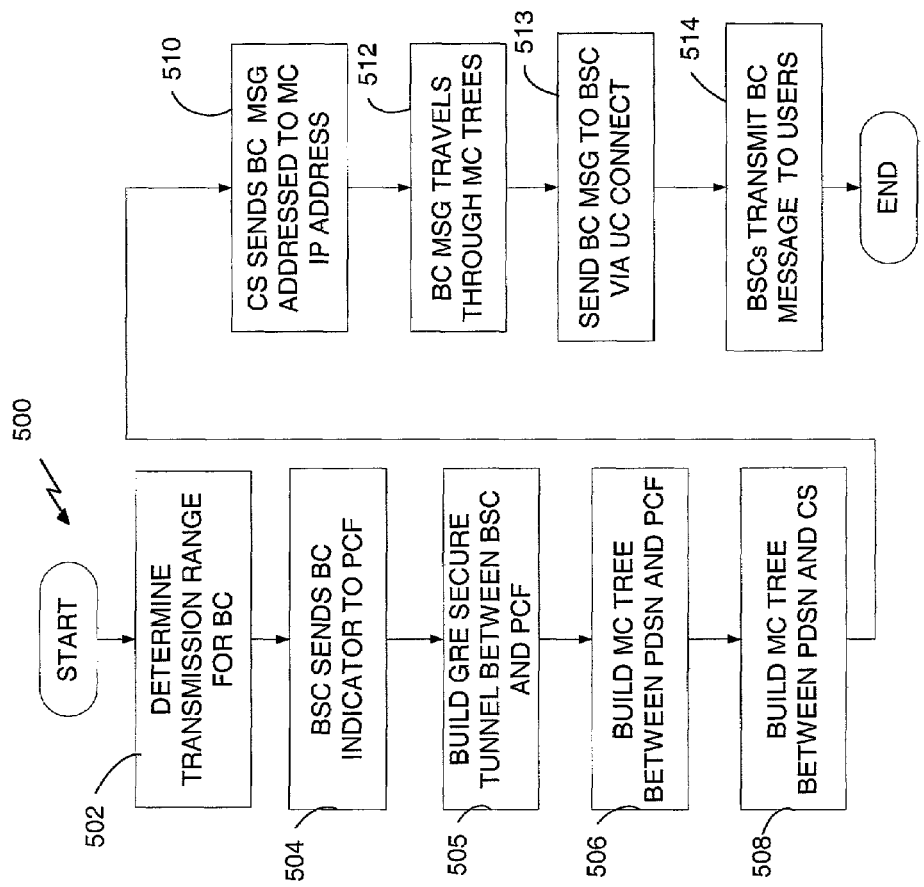
FIG. 7 is a flow diagram of broadcast processing in a wireless communication system incorporating multicast Internet Protocol transmissions.

FIG. 7 illustrates a method 500 for processing BC messages according to one embodiment. The process 500 builds a MC tree between at least one BSC and a PCF. The tree may include multiple BSCs. Similarly, additional trees may be built for additional PCFs. The MC tree forms a path for sending a BC message to multiple recipients without setting up point-to-point connections. The process 500 also builds a MC tree between at least one PCF and a PDSN. The tree may include multiple PCFs and one PDSN, wherein according to one embodiment, one internal multicast tree may flow through only one PDSN, i.e., there is only one base per tree). Additionally, the process 500 builds another MC tree between at least one PDSN and a CS. The tree may include multiple PDSNs.

The broadcast service of the embodiment illustrated in FIG. 7 is the broadcast of a BC message to a transmission range. At a first step 502 the process 500 determines the transmission range of cell(s), sector(s), and/or geographical area(s) for transmission of the BC message. The transmission range information is used to build an MC tree. Specifically, identification of the transmission range identifies the leaves of the MC tree. The MC tree is built from the leaves to the base. The BSC sends a broadcast indicator to the PCF at step 504. The broadcast indicator is a signaling message to alert the PCF that the BSC wants to receive the broadcast. The process then builds a first connection between the BSC(s) of the transmission range and the associated PCF(s) at step 505. The connection is a GRE secure tunnel between each BSC and PCF pair. The process then builds a MC tree between the PDSN and the PCF at step 506. The transmission range identifies the PCF(s) for BC transmission. Each PCF within the transmission range initiates the MC tree by registering with a neighboring Multicast router. According to the exemplary embodiment, the process then builds another MC tree from the PDSN(s) to the CS at step 508. At step 510 the CS sends the BC message to the PDSN(s), wherein the BC message is encapsulated in a MC IP packet. The MC IP packet is addressed to the MC IP address and identifies the CS as the source of the packet. The MC IP packet address indicates delivery to any of the PDSN in the MC tree between the PDSN(s) and the CS. At step 512 the BC message traverses the MC trees. The BC message is then sent to the BSC via the secure tunnel or UC connection at step 513. The BSCs transmit the BC message to users in respective coverage areas at step 514.

Note that at this point, to accommodate soft handoff, the receiving BSC may be used as an anchor BSC to timestamp the BC message and then forward it to neighboring BSC(s). In this way, the BC message is transmitted from multiple BSCs to a given user, allowing the user to transition to a better connection without losing the transmission. Additionally, the use of an anchor BSC provides efficiency as the PCF only transmits the BC message to one BSC, but the message may be provided to multiple other BSCs.

Figure 8:
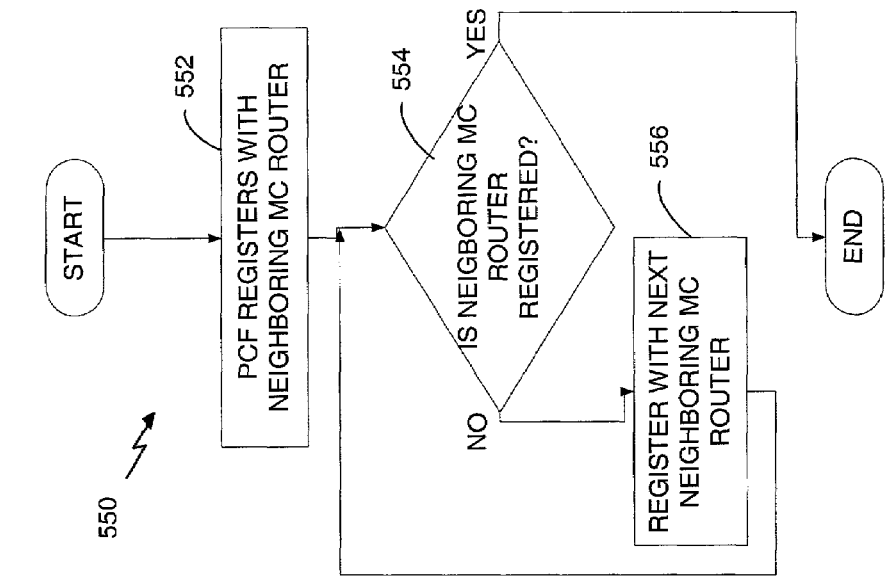
FIG. 8 is a flow diagram of a process for building a multicast tree in a communication system.

FIG. 8 illustrates the process 550 of building an MC tree from a PCF to a PDSN. At step 552 the PCF registers with the next neighboring Multicast router. The registration with the Multicast router initiates a registration chain, wherein each member of the chain registered with the next successive router. The registration with the Multicast router further involves identifying the registering PCF as a member of a given MC group and a target of any IP packets addressed to the MC IP address of the MC group. Note that for a BC message, the MC group may be considered the target range. At decision diamond 554 if the Multicast router is registered, the process ends as the MC tree is complete. If the Multicast router is not registered, i.e., not part of the MC tree, the Multicast router registers with the next successive neighboring Multicast router at step 556.

Figure 9A:
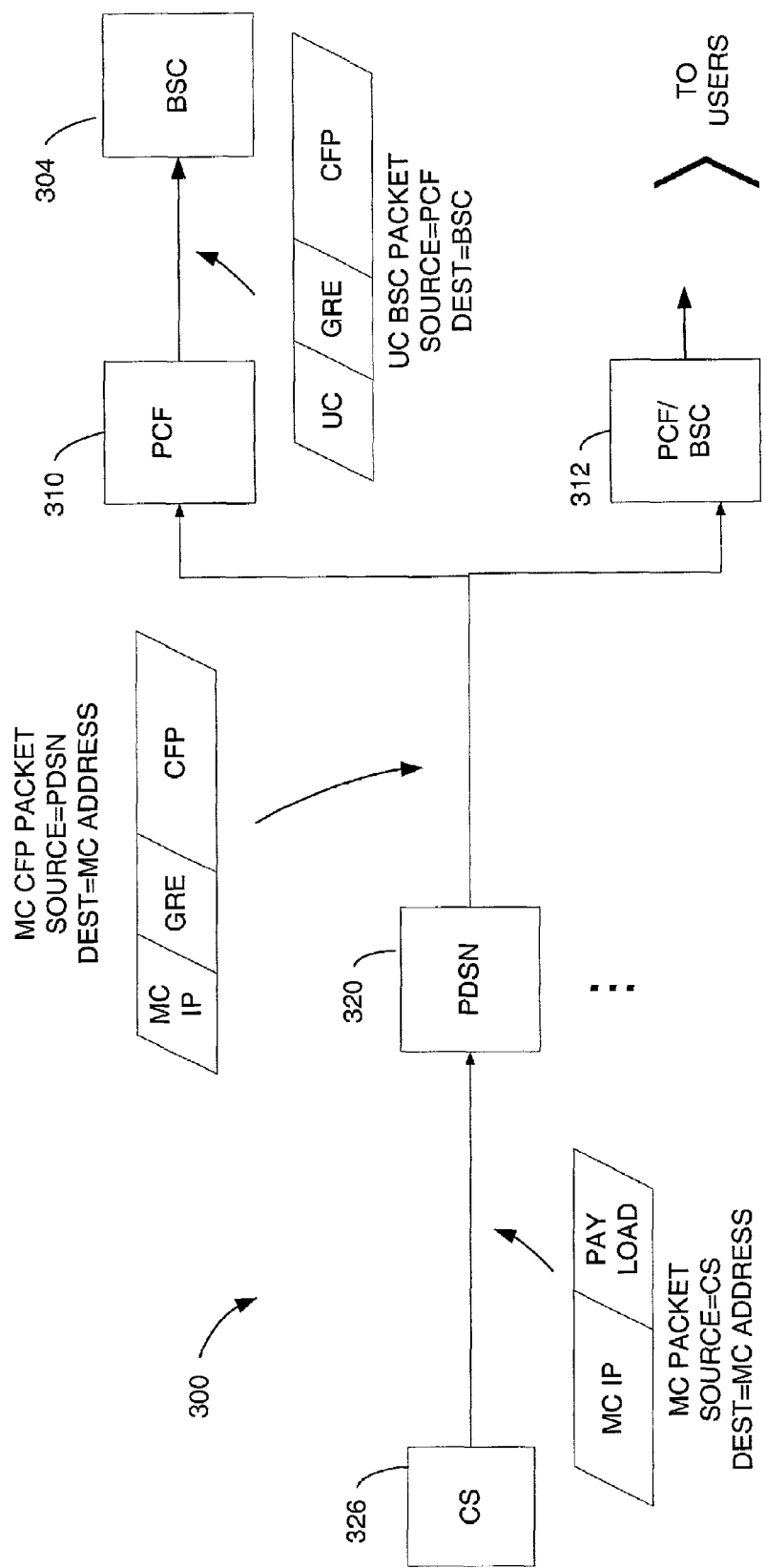
FIG. 9A is a flow diagram of multicast processing of a broadcast message in a wireless communication system.
Figure 9B:
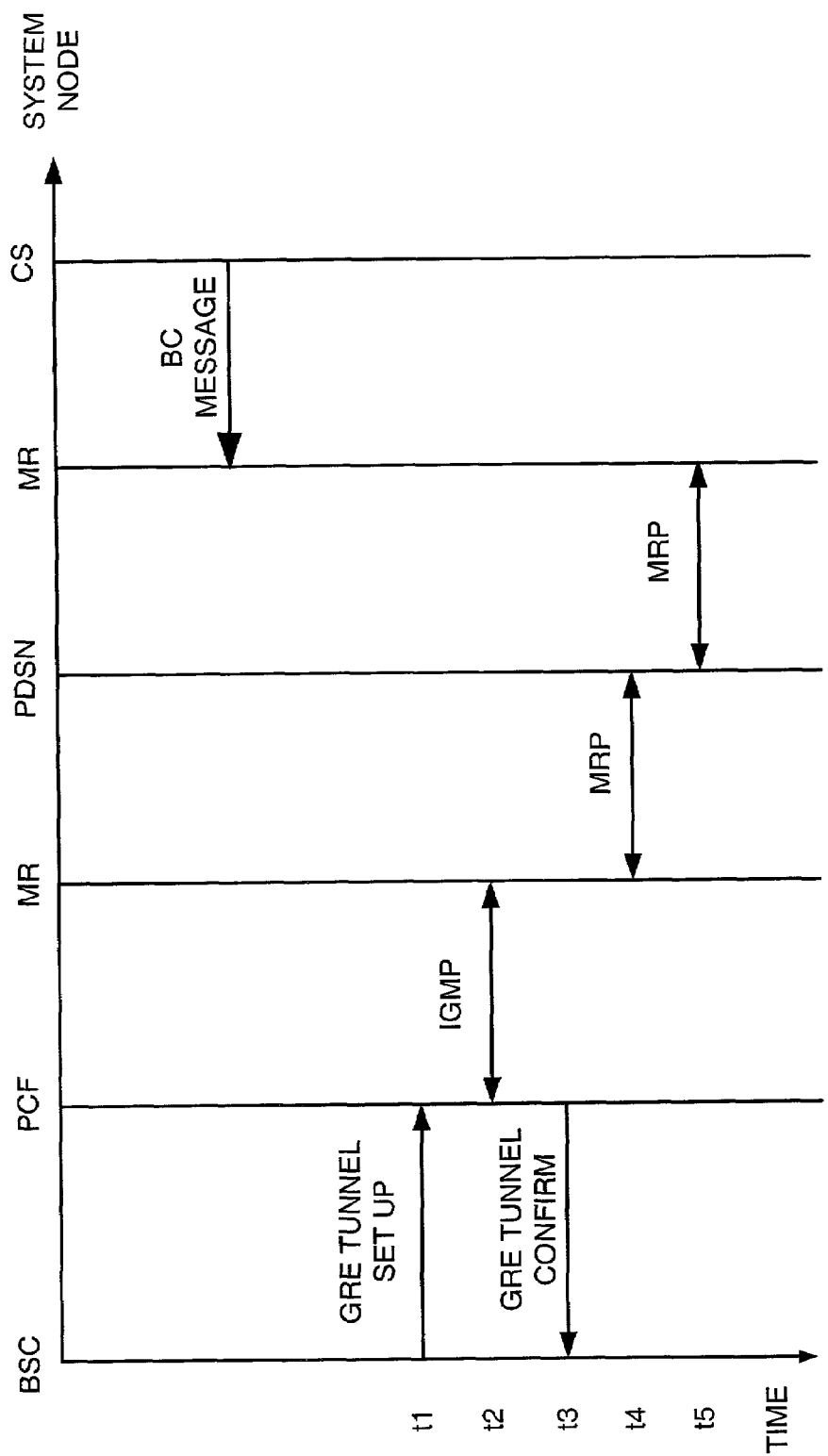
FIG. 9B is a signal flow diagram of setting up a data path in a wireless communication system using a multicast Internet Protocol.

FIG. 9A illustrates the flow of a BC message through multiple MC trees, as described in the process 500 of FIGS. 7 and 8. FIG. 9B illustrates the corresponding signal flow of information, i.e., broadcast message processing. As illustrated in FIG. 9A, the BC message originates at the CS 326. The original message is considered the payload. The CS 326 encapsulates the payload by applying a MC IP to generate a MC IP packet. The MC IP packet indicates the CS is the source of the packet and the destination is given as the MC IP address. The MC IP packet is sent to the next contacts on the tree. In other words, the MC IP packet traverses the tree from the source or base of the tree outward toward the leaves. For clarity, a single PDSN is illustrated, specifically PDSN 320, however, the MC tree may include any number of PDSNs each identified by the MC IP address. The PDSN 320, and any other PDSN in the MC tree, compress the MC IP packet and apply a framing protocol, such as HDLC, to form a Compressed Framed Packet (CFP). The CFP is then encapsulated by a GRE protocol to form a GRE packet. The resulting GRE packet is further encapsulated according to a MC IP, resulting in a MC CFP, i.e., multicast compressed framed packet. The MC CFP identifies the PDSN 320 as the source and the MC IP address as the destination. In the example illustrated in FIG. 9A, the PDSN 320 passes the MC CFP to PCFs 310 and 312, each part of the MC tree. Each of PCFs 310 and 312 processes the received MC to form secure tunnels to the BSC(s), such as to BSC 304, wherein the resultant packet is a UC BSC packet identifying the respective PCF as the source and the BSC IP address as the destination. Note that each PCF may form multiple tunnels to individual BSCs. As illustrated, the MC IP addressing is used until the message arrives at the PCF. From the PCF to the end user, this embodiment uses secure tunnels or UC connections.

FIG. 9B illustrates the corresponding signal flow, wherein the CS initially sets up a HSBS channel. At time t1 the GRE tunnel is set up between the BSC and the PCF. At time t2 the PCF registers with the neighboring Multicast router using IGMP. At time t3 the PCF confirms the GRE tunnel set up with the BSC. At time t4 a MC Routing Protocol (MRP) is used to register Multicast routers between the PCF and the PDSN. At time t5 the PDSN registers with the neighboring Multicast router. The process forms the external portion of the MC tree. Each of the levels of the MC tree, i.e., CS to PDSN, and PDSN to PCF, may be considered an individual MC tree or the entire structure from CS to PCF may be considered one tree. At this point the BSC is setup to receive BC messages via MC IP from the BC CS for the given HSBS channel.

Figure 10:
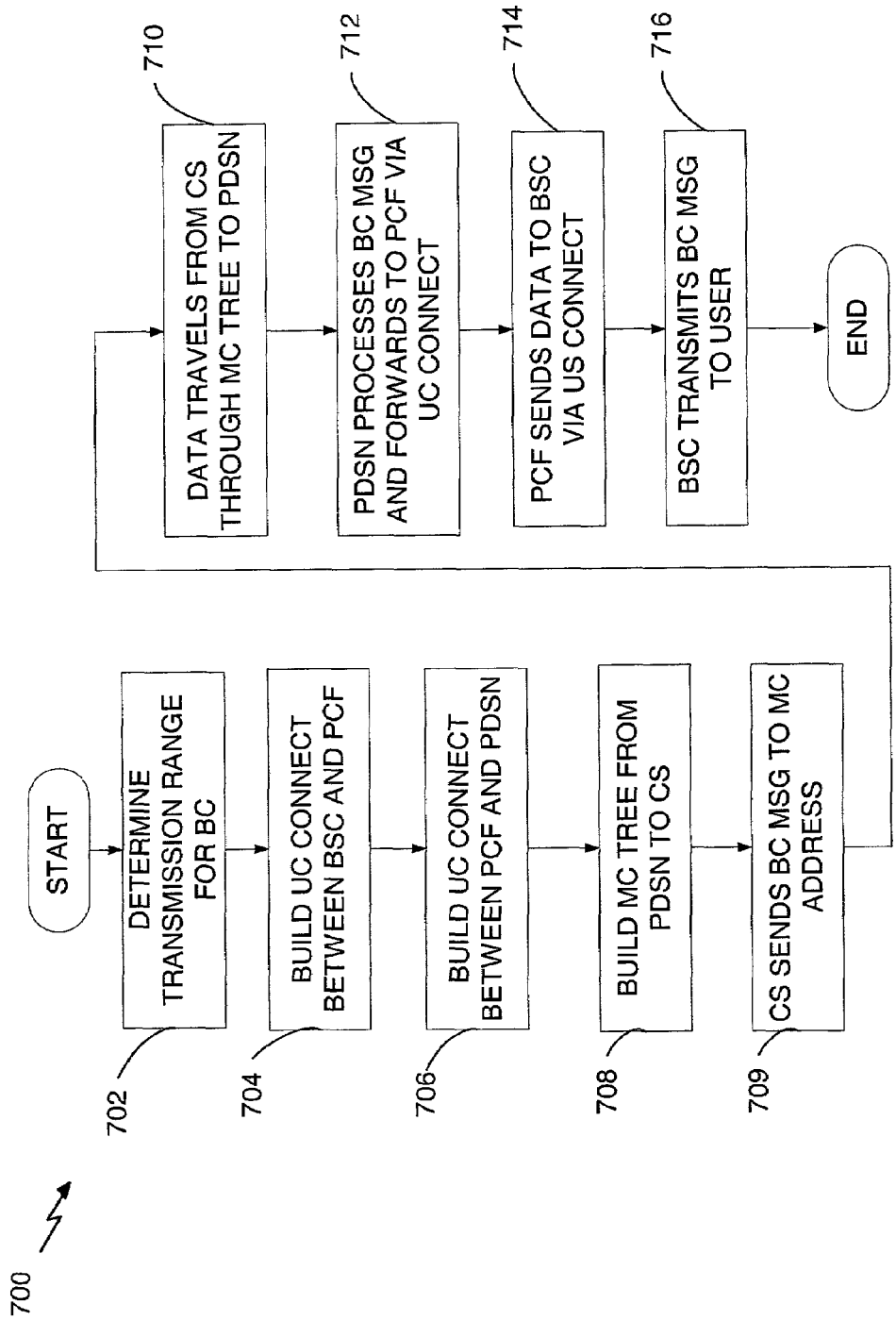
FIG. 10 is a flow diagram of multicast processing of a broadcast message in a wireless communication system.

FIG. 10 illustrates an alternate embodiment of a process 700 for transmitting a BC message. The process starts by determining the transmission range of the broadcast at step 702. At step 704 a UC connection is set up between the BSC and the PCF. The UC connection may be an A8/A9 IP connection. Similarly, a UC connection is set up between the PCF and the PDSN at step 706. In contrast to the process 500 of FIG. 10, no MC tree is built between the PDSN(s) and PCF(s). Rather, a point-to-point GRE Tunnel is formed to between each PDSN and PCF pair. The PDSN to PCF UC connection may be an A10/A11 IP connection. At step 708, a MC tree is built between the CS and the PDSN.

The CS then sends data to the PDSN(s) that are part of the MC tree at step 709. The data travels through the MC tree to the PDSN at step 710. The PDSN then processes the received data or BC message and forwards the BC message to the PCF at step 712. Note that when multiple PCFs are implemented, the PDSN creates multiple copies of the data for transmission to multiple PCFs. The PCF sends the data to the BSC via a UC connection at step 714. The data or BC message is then transmitted from the BSCs associated with the MC group to group members at step 716

Figure 11A:
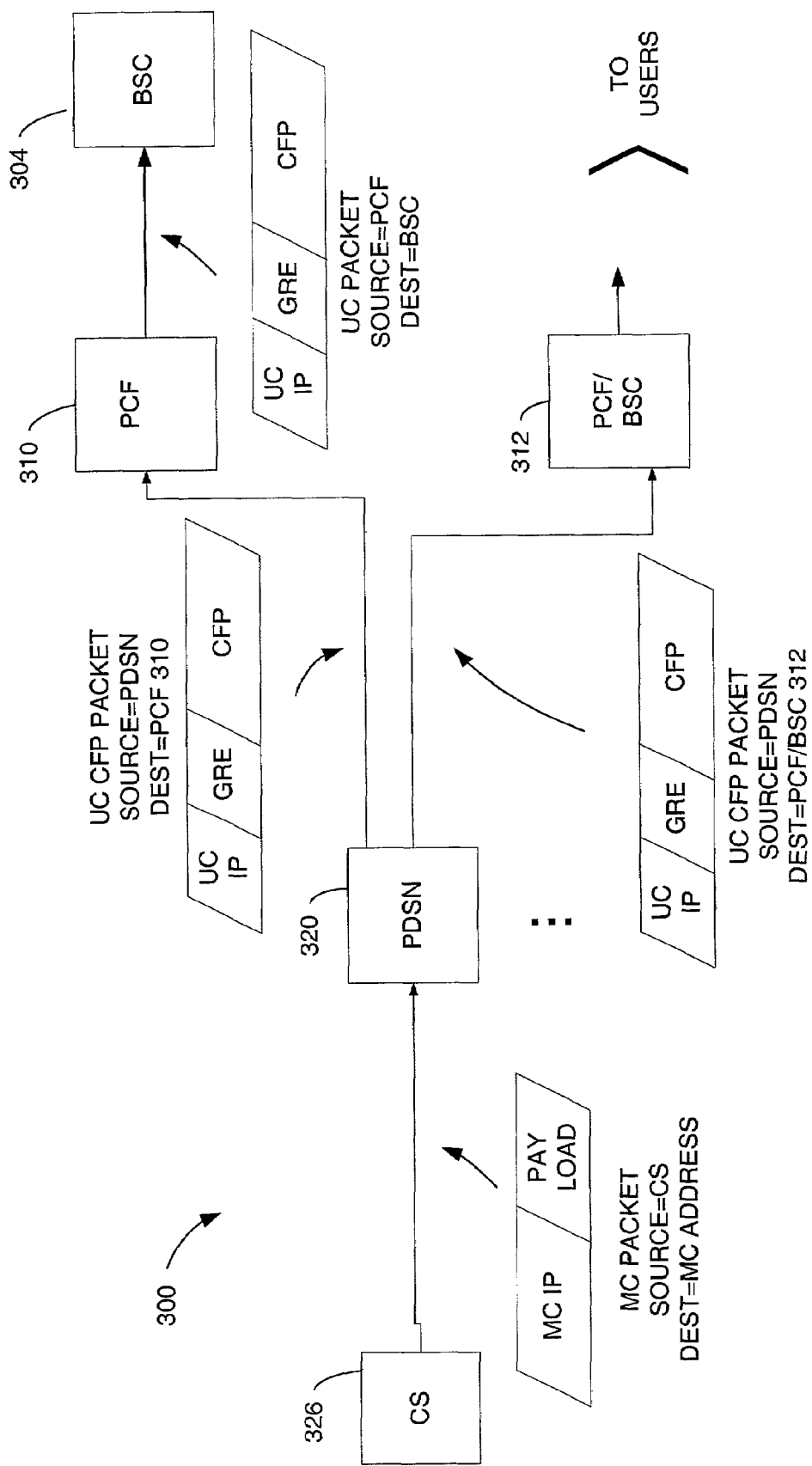
FIG. 11A is a flow diagram of multicast processing of a broadcast message in a wireless communication system.
Figure 11B:
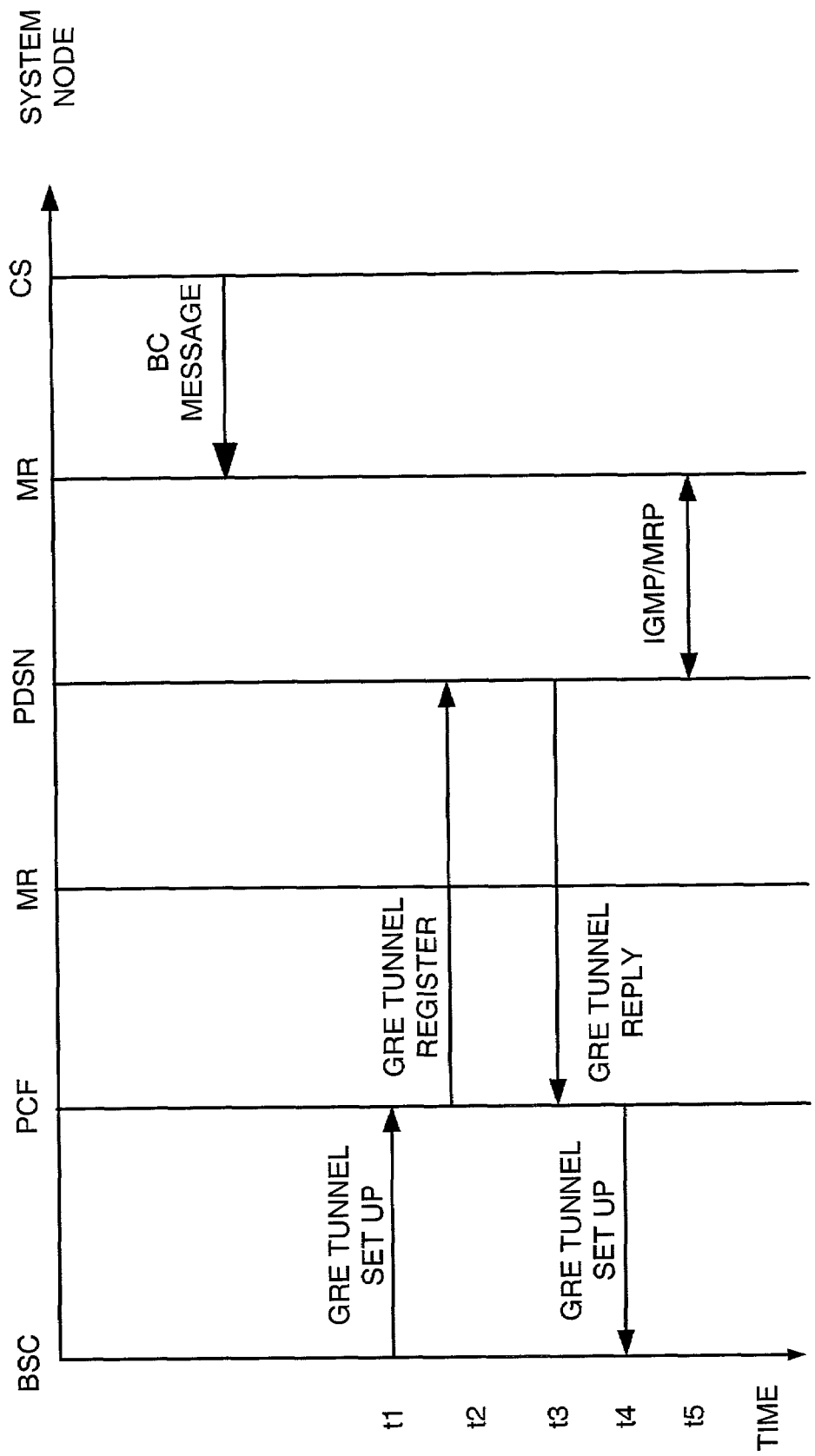
FIG. 11B is a signal flow diagram of broadcast processing in a wireless communication system using a multicast Internet Protocol.

FIG. 11A illustrates the flow of a BC message through multiple MC trees, as described in the process 700 of FIG. 10. FIG. 11B illustrates the corresponding signal flow of information, i.e., broadcast message processing. In contrast to process 500 of FIG. 7, the process 700 builds a MC tree between the CS and the PDSN(s), but incorporates point-to-point secure tunnels between the PDSN(s) and PCF(s), as well as between the PCF(s) and individual BSC(s). The user of point-to-point connections provides additional security at the expense of processing and bandwidth considerations.

As illustrated in FIG. 11A, the BC message originates at the CS 326. The original message is considered the payload. The CS 326 encapsulates the payload by applying a MC IP to generate a MC IP packet. The MC IP packet indicates the CS is the source of the packet and the destination is given as the MC IP address. The MC IP packet is sent to the next contacts on the tree. In other words, the MC IP packet traverses the tree from the source or base of the tree outward toward the leaves. For clarity, a single PDSN is illustrated, specifically PDSN 320, however, the MC tree may include any number of PDSNs each identified by the MC IP address. The PDSN 320, and any other PDSN in the MC tree, compress the MC IP packet and apply a framing protocol, such as HDLC, to form a Compressed Framed Packet (CFP). The CFP is then encapsulated by a GRE protocol to form a GRE packet. The resulting GRE packet is further encapsulated according to a Uni-Cast (UC) IP, resulting in a UC CFP, i.e., uni-cast compressed framed packet. The UC CFP identifies the PDSN 320 as the source and a specific PCF as the destination. In the example illustrated in FIG. 11A, the PDSN 320 passes the UC CFPs to PCFs 310 and 312. Each of PCFs 310 and 312 processes the received UC CFP in a similar manner to the PDSN 320, wherein the resultant packet is a UC BSC packet identifying the respective PCF as the source and a BSC as the destination.

FIG. 11B illustrates the corresponding signal flow, wherein the CS initially sets up a HSBS channel. At time t1 the BSC sets up the GRE tunnel between the BSC and the PCF. At time t2 the PCF PCF sets up GRE tunnel between PCF and the PDSN. At time t3 the PDSN confirms the GRE tunnel set up with the PCF. At time t4 the PCF confirms GRE tunnel set up with the BSC. At time t5, the PDSN uses IGMP or MRP to join a multicast group. Note that the initial processing may implement IGMP to the first router. The process forms the MC tree between the CS and the PDSN. At this point the BSC is setup to receive BC messages via MC IP from the BC CS for the given HSBS channel.

According to one embodiment, for BC service processing, the CS configures an HSBS channel using a local mechanism. The CS uses the MC IP address to send the HSBS content. The HSBS configuration results in the CS sending HSBS content to the corresponding MC group. The content is sent in the format of IP packets having the source IP address of the CS and the destination IP address as a MC IP address.

The BSC then decides to add an HSBS channel on a given broadcast channel. The broadcast channel is to be transmitted over a set of cells/sectors. The mechanism in the BSC to add an HSBS channel to a broadcast channel is implementation-specific. One example of such a mechanism is an interface that enables HSBS channel configuration on the BSC, such as an Operation Administration & Management (OA & M) interface. The BSC uses the local mechanism to setup the HSBS channel, using information such as the HSBS_ID of the HSBS channel and the MC IP address corresponding to the HSBS content.

The BSC sends an A9-Setup-A8 message to the PCF. In the A9-Setup-A8 message, the BSC sends A8_Traffic_ID parameter that contains among other things, the GRE key, and the IP address of the BSC entity that terminates the A-8 connection for the HSBS channel. An additional field, IP_MulticastAddress, is added to the A8_Traffic_ID parameter. The additional field identifies an IP multicast address that is used by the CS to transmit the HSBS content. A new service option for HSBS service is used in the A9-Setup-A8 message.

Upon receiving the A9-Setup-A8 message from the BSC, the PCF is alerted that the BSC wants to join an IP multicast group. If the PCF is already a member of the desired multicast group then no further action may be necessary to join the multicast group. Otherwise, the PCF sends an IGMP request to its multicast router to join the multicast group. Upon successful IGMP setup, the PCF sends the A9-Connnect-A8 message back to the BSC. The multicast route information propagates from the multicast router using multicast routing protocol to the upstream routers, through PDSN all the way to the CS. This sets up a multicast path or tree from the CS to the PCF. The PCF achieves binding of GRE A8-Key, BSC IP address and IP Multicast address to properly tunnel IP multicast packets to a BSC.

There are several multicast routing protocols used for multicast routing in an IP environment. The Distance Vector Multicast Routing Protocol (DVMRP) is specified in RFC 1075 by D. Waitzman, C. Partridge, S. E. Deering on Nov. 1, 1988. The Protocol Independent Multicast-Sparse Mode (PIM-SM) is specified in RFC 2362 by D. Estrin, D. Farinacci, A. Helmy, D. Thaler, S. Deering, M. Handley, V. Jacobson, C. Liu, P. Sharma, L. Wei in June 1998. There is also Multicast Open Shortest Path First (MOSPF), specified in RFC 1584 entitled "Multicast Extensions to OSPF." By J. Moy in March 1994.

Continuing with FIG. 11B, a GRE connection is set from the BSC to the PCF, wherein a GRE tunnel set up message is sent, such as illustrated at time t1 of FIG. 11B. In the GRE set up message, the BSC sends a Traffic_ID parameter containing, the GRE key, and the IP address of the BSC entity terminating the connection for the HSBS channel. The IP_MulticastAddress, is added to the Traffic_ID parameter. The Traffic_ID parameter may include a variety of other information. The IP_MulticastAddress identifies an IP MC address used by the CS to transmit the HSBS content.

In operation, the CS sends the HSBS content, e.g., BC message, to a MC IP address. The MC IP address is used in the destination address field of the IP packets. The multicast router routes the packet to member PDSN(s). Note that the multicast group membership is established earlier using IGMP and MC routing protocol. After header compression (if it is performed), PDSN places each packet in an HDLC frame. The HDLC frame is encapsulated in a GRE/IP packet. The PDSN sets the Key field of the GRE packet to the destination MC IP address of the encapsulated IP packet. The GRE packet is appended with the 20-byte IP packet header having source address field of the PDSN IP address and destination address field of the same MC IP address as the encapsulated packet. The PDSN sends the encapsulated HDLC frame to the member Multicast router(s). All multicast member PCFs receive the MC packets. The need for sequencing is due to the header compression in the PDSN. The GRE includes sequence numbers identifying packets. The GRE sequence numbers ensure in-order delivery of packets.

Multiple BSCs may be used to broadcast a same HSBS channel to cover a certain geographic area. In this case, the HSBS channel is associated with a specific frequency. To facilitate autonomous soft hand off, transmission of the Fundamental Broadcast Service Channel or F-BSCH is synchronized in a geographic area. This allows for combining of broadcast packets at the mobile station. According to one embodiment the MC tree includes a leaf referred to as an "anchor BSC" that duplicates the broadcast content to the secondary BSC. The anchor BSC will duplicate and send the HDLC frames to any secondary BSC(s) over a specific interface, wherein the transmission to the secondary BSC(s) have a constrained delay.

Figure 12:
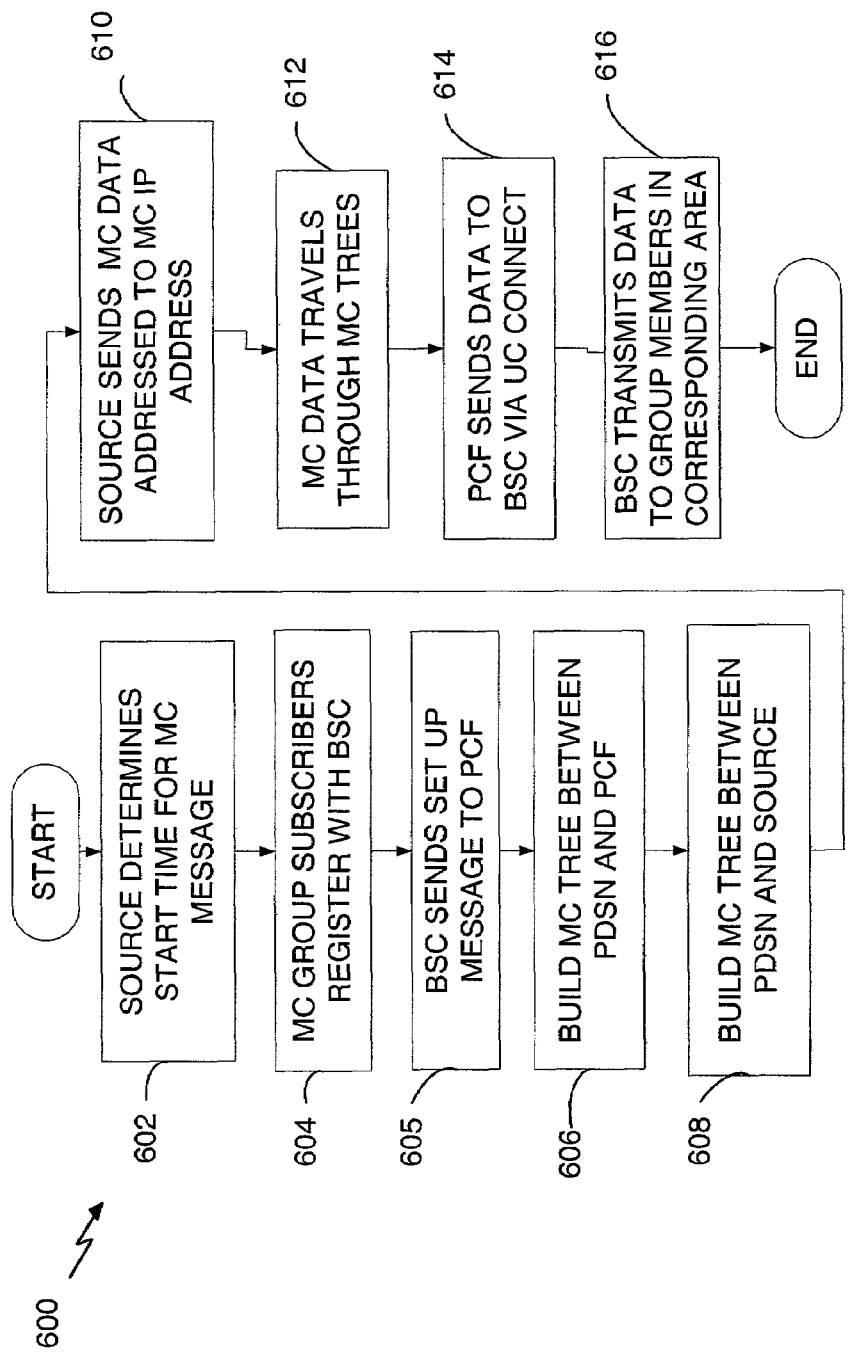
FIG. 12 is a flow diagram for a message flow for a group call service in a wireless communication system topology.

FIG. 12 illustrates a method of processing of a MC message is transmitted to a MC group. The process is for a Group Call service, wherein the message to be broadcast may originate with a user in the system. The group call allows a user to provide point-to-multipoint transmission. One user in the group transmits a message for multiple intended recipients. The process 600 begins at step 602 wherein the CS determines a start time for the MC message. The MC group subscribers register with the BSC at step 604. At step 605 the BSC sends a set up message to the PCF. The set up message initiates the formation of a GRE tunnel between the BSC and PCF, while also alerting the PCF that the BSC is part of the Group Call. The process builds an MC tree at step 606 between the PDSN and the PCF(s). The process then builds an internal MC tree form the PDSN to the CS at step 608. Once the MC trees are set up the source sends the MC message addressed to the MC IP address at step 610. The message travels through the trees at step 612. The PCF transmits the MC message to the BSC via a UC connection at step 614. The BSC then forwards the MC message to the group members within the corresponding geographical area at step 616.

Note that for a MC message transmitted to a MC group, the group members move within the communication system. When a group member moves to a location that is not registered within the MC tree or is not part of the MC message transmission, the group member registers with the BSC of the new location. During a group call, the group member will be monitoring the frequency assigned to the BC channel used for the group call. By registering with a new BSC, the group member provides the system with the frequency of the BC. The system is then able to page the group member of an incoming call. Once the group member registers with a new BSC, the system creates a new MC tree that includes the new BSC.

Alternate embodiments may apply the methods discussed hereinabove to alternate BC services, wherein a point-to-multipoint transmission is used. The use of MC trees formed by the leaves or termination points registering with successive routers provides a convenient and dynamic method of avoiding redundancies in the communication system. Additionally, the use of MC trees provides increased scalability reducing the amount of infrastructure required for expanding the network.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An infrastructure element for providing broadcast transmissions in a communication network, the infrastructure element comprising:
    means for joining an external multicast tree;
    means for joining an internal multicast tree;
    means for receiving a first multicast transmission over the external multicast tree, wherein the first multicast transmission identifies a selected content source as a source of the first multicast transmission;
    means for encapsulating the first multicast transmission to form an encapsulated packet; and
    means for transmitting the encapsulated packet over the internal multicast tree in a second multicast transmission, wherein the second multicast transmission identifies the infrastructure element as a source of the second multicast transmission.

2. The infrastructure element of claim 1, wherein said means for encapsulating comprises:
    means for compressing the first multicast transmission to form a compressed frame packet; and
    means for encapsulating the compressed frame packet to form the encapsulated packet.

3. The infrastructure element of claim 2, wherein said means for encapsulating the compressed frame packet comprises means for encapsulating the compressed frame packet utilizing a framing protocol.

4. An apparatus configured to provide broadcast transmissions in a communication network, the apparatus comprising:
    a processor coupled to circuitry configured to:
    join an external multicast tree;
    join an internal multicast tree;
    receive a first multicast transmission over the external multicast tree, wherein the first multicast transmission identifies a selected content source as a source of the first multicast transmission;
    encapsulate the first multicast transmission to form an encapsulated packet; and
    transmit the encapsulated packet over the internal multicast tree in a second multicast transmission, wherein the second multicast transmission identifies the infrastructure element as a source of the second multicast transmission.

5. The apparatus of claim 4, wherein the processor coupled to the circuitry are further configured to:

compress the first multicast transmission to form a compressed frame packet; and encapsulate the compressed frame packet to form the encapsulated packet.

6. The apparatus of claim 5, wherein the processor coupled to the circuitry are further configured to encapsulate the compressed frame packet utilizing a framing protocol.

7. A method for providing broadcast transmissions in a communication network, the method comprising:

joining an external multicast tree;

joining an internal multicast tree;

receiving a first multicast transmission over the external multicast tree, wherein the first multicast transmission identifies a selected content source as a source of the first multicast transmission;

encapsulating the first multicast transmission to form an encapsulated packet; and transmitting the encapsulated packet over the internal multicast tree in a second multicast transmission, wherein the second multicast transmission identifies the infrastructure element as a source of the second multicast transmission.

8. The method of claim 7, wherein said encapsulating comprises:

compressing the first multicast transmission to form a compressed frame packet; and encapsulating the compressed frame packet to form the encapsulated packet.

9. The method of claim 8, wherein said encapsulating the compressed frame packet comprises encapsulating the compressed frame packet utilizing a framing protocol.

10. A computer program product for providing broadcast transmissions in a communication network, the computer program product comprising:

a computer-readable medium encoded with codes executable to:

join an external multicast tree;

join an internal multicast tree;

receive a first multicast transmission over the external multicast tree, wherein the first multicast transmission identifies a selected content source as a source of the first multicast transmission encapsulate the first multicast transmission to form an encapsulated packet; and transmit the encapsulated packet over the internal multicast tree in a second multicast transmission, wherein the second multicast transmission identifies the infrastructure element as a source of the second multicast transmission.

11. The computer program product of claim 10, wherein said codes executable to encapsulate comprise codes executable to:

compress the first multicast transmission to form a compressed frame packet; and encapsulate the compressed frame packet to form the encapsulated packet.

12. The computer program product of claim 11, wherein said codes executable to encapsulate the compressed frame packet comprises codes executable to encapsulate the compressed frame packet utilizing a framing protocol.

* * * * *